(12) United States Patent
Navarrete Michelini et al.

(10) Patent No.: US 11,361,222 B2
(45) Date of Patent: Jun. 14, 2022

(54) SYSTEM, METHOD, AND COMPUTER-READABLE MEDIUM FOR IMAGE CLASSIFICATION

(71) Applicant: BOE TECHNOLOGY GROUP CO., LTD., Beijing (CN)

(72) Inventors: Pablo Navarrete Michelini, Beijing (CN); Dan Zhu, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 286 days.

(21) Appl. No.: 16/614,547

(22) PCT Filed: Jun. 20, 2019

(86) PCT No.: PCT/CN2019/092042
§ 371 (c)(1),
(2) Date: Nov. 18, 2019

(87) PCT Pub. No.: WO2020/062957
PCT Pub. Date: Apr. 2, 2020

(65) Prior Publication Data
US 2021/0365744 A1    Nov. 25, 2021

(30) Foreign Application Priority Data

Sep. 30, 2018 (CN) .......................... 201811155147.2
Sep. 30, 2018 (CN) .......................... 201811155252.6
(Continued)

(51) Int. Cl.
*G06N 3/00*      (2006.01)
*G06N 3/08*      (2006.01)
(Continued)

(52) U.S. Cl.
CPC ............... *G06N 3/08* (2013.01); *G06F 17/16* (2013.01); *G06K 9/6232* (2013.01);
(Continued)

(58) Field of Classification Search
CPC .. G06K 9/6268; G06K 9/6202; G06K 9/6257; G06N 3/0454; G06N 3/0481; G06N 3/08
See application file for complete search history.

(56) References Cited

U.S. PATENT DOCUMENTS 6,766,067 B2    7/2004    Freeman et al.
9,727,959 B2    8/2017    Meyers et al.
(Continued)

FOREIGN PATENT DOCUMENTS

CN      101593269 A      12/2009
CN      101872472 A      10/2010
(Continued)

OTHER PUBLICATIONS

Wang et al, High-resolution image synthesis and sematic manipulation with conditional GANs, arXiv 1711.11585v2 20 Aug. 20, 2018.*
Bulat et al, To learn image super-resolution, use a GAN to learn how to do image degradation first, arXiv 1807.11458v1 Jul. 30, 2018.*
He et al, Deep residual learning for image recognition, CVPR 2016, pp. 770-778 (Year: 2016).*
(Continued)

*Primary Examiner* — Ping Y Hsieh
*Assistant Examiner* — Xiao Liu
(74) *Attorney, Agent, or Firm* — WHDA, LLP

(57) ABSTRACT

A cascaded system for classifying an image includes a first cascade layer including a first analysis module coupled to a first input terminal, and a first pooling module coupled to the first analysis module; a second cascade layer including a second analysis module coupled to a second input terminal, and a second pooling module coupled to the first pooling module and the second analysis module; a synthesis layer coupled to the second pooling module, and an activation layer coupled to the synthesis layer.

18 Claims, 8 Drawing Sheets

(30) Foreign Application Priority Data

Sep. 30, 2018 (CN) .......................... 201811155326.6
Sep. 30, 2018 (CN) .......................... 201811155930.9

(51) Int. Cl.

| | |
|---|---|
| *G06F 17/16* | (2006.01) |
| *G06N 3/04* | (2006.01) |
| *G06T 3/40* | (2006.01) |
| *G06K 9/62* | (2022.01) |
| *G06T 5/00* | (2006.01) |
| *G06T 5/50* | (2006.01) |
| *G06V 10/75* | (2022.01) |

(52) U.S. Cl.

CPC ......... *G06K 9/6257* (2013.01); *G06K 9/6268* (2013.01); *G06N 3/0454* (2013.01); *G06N 3/0481* (2013.01); *G06N 3/088* (2013.01); *G06T 3/4007* (2013.01); *G06T 3/4046* (2013.01); *G06T 3/4076* (2013.01); *G06T 5/002* (2013.01); *G06T 5/50* (2013.01); *G06V 10/751* (2022.01); *G06T 2207/20081* (2013.01); *G06T 2207/20084* (2013.01); *G06T 2207/20212* (2013.01)

(56) References Cited

U.S. PATENT DOCUMENTS

| | | | |
|---|---|---|---|
| 9,865,036 | B1 | 1/2018 | Liu et al. |
| 2017/0365038 | A1 | 12/2017 | Denton et al. |
| 2018/0075581 | A1 | 3/2018 | Shi et al. |
| 2019/0333198 | A1* | 10/2019 | Hsieh ............... G06N 3/0454 |
| 2019/0333199 | A1* | 10/2019 | Ozcan ............... G06N 3/088 |

FOREIGN PATENT DOCUMENTS

| | | | |
|---|---|---|---|
| CN | 103514580 | A | 1/2014 |
| CN | 105144232 | A | 12/2015 |
| CN | 103903236 | B | 8/2016 |
| CN | 105975931 | A | 9/2016 |
| CN | 105975968 | A | 9/2016 |
| CN | 107133601 | A | 9/2017 |
| CN | 107154023 | A | 9/2017 |
| CN | 107527044 | A | 12/2017 |
| CN | 107766860 | A | 3/2018 |
| CN | 107767343 | A | 3/2018 |
| CN | 107977932 | A | 5/2018 |
| CN | 108052940 | A | 5/2018 |
| CN | 108154499 | A | 6/2018 |
| CN | 108268870 | A | 7/2018 |
| CN | 108334848 | A | 7/2018 |
| CN | 108416428 | A | 8/2018 |
| CN | 108476291 | A | 8/2018 |
| CN | 108596830 | A | 9/2018 |
| CN | 109345456 | A | 2/2019 |
| RU | 2635883 | C1 | 11/2017 |
| WO | 02089046 | A1 | 11/2002 |
| WO | 2017/100903 | A1 | 6/2017 |

OTHER PUBLICATIONS

Translation of International Search Report dated Sep. 27, 2019, issued in counterpart application No. PCT/CN2019/092042. (10 pages).

Office Action dated Feb. 11, 2020, issued in counterpart CN Application No. 201811155930.9, with English translation. (20 pages).

Office Action dated Apr. 26, 2020, issued in counterpart CN Application No. 201811155326 6, with English translation (11 pages).

Office Action dated May 21, 2021, issued in counterpart AU application No. 2019350918. (4 pages).

Issue Notification dated Oct. 13, 2021, issued in counterpart RU Application No. 2020136214/28 (066777), with English Translation. (24 pages).

Office Action dated Nov. 8, 2021, issued in counterpart IN Application No. 202047021736, with English Translation. (6 pages).

Office Action dated Dec. 27, 2021, issued in counterpart IN Application No. 202027055323, with English Translation. (5 pages).

Office Action dated Oct. 29, 2021, issued in counterpart KR Application No. 10-2020-7014462, with English Translation. (11 pages).

Notice of Acceptance for Patent Application dated Sep. 28, 2021, issued in counterpart AU Application No. 2019350918. (3 pages).

Michelini et al., "Multi-Scale Recursive and Perception-Distortion Controllable Image Super-Resolution", ECCV, and Sep. 14, 2018, pp. 1-16.; Cited in KR Office Action dated Oct. 29, 2021. (16 page).

Liu et al., "Deep networks for image-to-image translation with Mux and Demux Layers", ECCV, and Sep. 14, 2018, pp. 1-16; Cited in KR Office Action dated Oct. 29, 2021. (16 page).

Office Action dated May 13, 2021, issued in counterpart RU Application No. 2020136214/28 (066777), with English Translation. (11 pages).

Office Action dated Apr. 27, 2020, issued in counterpart CN Application No. 201811155147.2, with English translation. (13 pages).

Office Action dated Oct. 27, 2020, issued in counterpart CN Application No. 201811155147.2, with English translation. (7 pages).

Gao, Yuan et al., "Medical image super-resolution algorithm based on deep residual generative adversarial network", Journal of Computer Applications, 2018, 38(9), p. 2689-2695, with English Abstract; Cited in CN Office Action dated Apr. 27 and 26, 2020. (7 pages).

Le, Zou, "Reflection Removal with Generative Adversarial Networks", A Dissertation Submitted for the Degree of Master (South China University of Technology Guangzhou, China), with English Abstract; Cited in CN Office Action dated Feb. 11, 2020 (CNOA cited in prior IDS). (75 pages).

Office Action dated Jun. 30, 2020, issued in counterpart CN Application No. 201811155252.6, with English Translation. (10 pages).

Wang, Wanliang et al., "Advances in generative adversarial network", Journal on Communications, Feb. 2018, vol. 39, No. 2, with English Abstract; Cited in CN Office Action dated Jun. 30, 2020. (14 pages).

Salimans, Tim et al., "Improved Techniques for Training GANs", arXiv, Dec. 2016; Cited in CN Office Action dated Jun. 30, 2020. (10 pages).

\* cited by examiner

SYSTEM, METHOD, AND COMPUTER-READABLE MEDIUM FOR IMAGE CLASSIFICATION

CROSS-REFERENCE TO RELATED APPLICATIONS

This application claims benefit of the filing date of each of Chinese Patent Application No. 201811155326.6 filed on Sep. 30, 2018, Chinese Patent Application No. 201811155252.6 filed on Sep. 30, 2018, Chinese Patent Application No. 201811155147.2 filed on Sep. 30, 2018, and Chinese Patent Application No. 201811155930.9 filed on Sep. 30, 2018, the disclosure of each of which is hereby incorporated in its entirety by reference.

TECHNICAL FIELD

The present disclosure generally relates to the field of deep learning technologies, and more particularly, to a system, method, and computer-readable medium for deep learning-based image classification.

BACKGROUND

Deep learning technology on the basis of an artificial neural network has made great progress in such fields as image processing. An advantage of the deep learning technology lies in the solution of different technical problems using an all-purpose structure and a relatively similar system.

BRIEF SUMMARY

An embodiment of the present disclosure is a cascaded system for classifying an image. The cascaded system may comprise a first cascade layer comprising a first analysis module coupled to a first input terminal, and a first pooling module coupled to the first analysis module; a second cascade layer comprising a second analysis module coupled to a second input terminal, and a second pooling module coupled to the first pooling module and the second analysis module; a synthesis layer coupled to the second pooling module; and an activation layer coupled to the synthesis layer.

In some embodiments, the first cascade layer may be configured to receive a first input image having a first input resolution $R_{1,\ input}$ via the first analysis module and generate a first output image via the first pooling module based on the first input image. The second cascade layer may be configured to receive a second input image having a second input resolution $R_{2,\ input}$ via the second analysis module and the first output image from the first cascade layer, and generate a second output image via the second pooling module. The synthesis layer may be configured to generate a training image based on the second output image. The activation layer may be configured to apply an activation function to the training image, and classify the training image based on the comparison with the predetermined standard image.

In some embodiments, the first input resolution and the second input resolution have the following relationship: $R_{1,\ input} > R_{2,\ input}$. In some embodiments, each of the first output image and the second output image may have a lower resolution than the corresponding first input image and second input image, respectively.

In some embodiments, $R_{1,\ input} = 2R_{2,\ input}$.

In some embodiments, The first output image may have a first output resolution $R_{1,\ output}$, and the second output image has a second output resolution $R_{2,\ output}$, and $R_{1,\ output} = \frac{1}{2} R_{1,\ input}$, and $R_{2,\ output} = \frac{1}{2} R_{2,\ input}$.

In some embodiments, each of the first analysis module and the second analysis module may be configured to generate a feature image of a corresponding input image.

In some embodiments, the feature image may have a larger number of color channels than the corresponding input image.

In some embodiments, each of the first analysis module and the second analysis module may comprise a first convolution layer configured to perform a convolution on the corresponding input image to generate an intermediate feature image, and a first filter configured to apply a first filter to the intermediate feature image to generate the feature image.

In some embodiments, the first pooling module may be configured to concatenate a first feature image generated by the first analysis module with itself to generate a first composite image, and downsample the first composite image to generate a first downsampled composite image. The second pooling module may be configured to concatenate the second input image with the first output image to generate a second composite image, and downsample the second composite image to generate a second downsampled composite image. The first downsampled composite and the second downsampled composite image may be the first, and second output images, respectively.

In some embodiments, each of the first, and second downsampled composite images may have the same number of color channels as the corresponding feature image.

In some embodiments, each of the first, and second pooling modules may comprise a connector configured to perform the concatenating, a second convolution layer configured to downsample a corresponding composite image to generate an intermediate downsampled composite image, and a second filter configured to apply a second filter to the intermediate downsampled composite image to generate the downsampled composite image.

In some embodiments, the training image may have a smaller number of color channels than the second output image.

In some embodiments, the synthesis module may comprise a third filter configured to apply a third filter to the third output image to generate an intermediate training image, and a fourth convolution layer configured to perform a convolution on the intermediate training image to generate the training image.

In some embodiments, the activation layer may comprise a sigmoid layer.

Another embodiment of the present disclosure is a method for classifying an image. The method may comprise identifying from a plurality of input images a first input image having a highest resolution; performing at least one downsampling operation on the first input image on a cascaded convolutional neural network; and classifying an output image generated by performing the at least one downsampling operations, based on a comparison with a predetermined standard image.

In some embodiments, the performing of the at least one downsampling operations may comprise: extracting one or more feature from the first input image to generate a first feature image of the first input image; concatenating the first feature image with itself to generate a first composite image; downsampling the first composite image to generate a first output image; extracting one or more feature from a second input image from among the plurality of input images to generate a second feature image; concatenating the second feature image with the first output image to generate a second composite image; and downsampling the second composite image to generate a second output image.

In some embodiments, the first output image may have a lower resolution than the first input image, and the same resolution as the second input image.

In some embodiments, the first input image may have a first input resolution $R_{1,\,input}$, and the second input image has a second input resolution $R_{2,\,input}$, and $R_{1,\,input}=2R_{2,\,input}$.

In some embodiments, the first output image may have a first output resolution, and the second output image has a second output resolution, and $R_{1,\,output}=\frac{1}{2}R_{1,\,input}$, and $R_{2,\,output}=\frac{1}{2}R_{2,\,input}$.

In some embodiments, the steps of extracting, concatenating, and downsampling may be repeated for each of the plurality of input images in sequence, and each subsequent one of the plurality of input images may have a lower resolution than a previous one of the plurality of input images.

In some embodiments, the classifying of the output image may comprise generating a training image based on the output image; and classifying the training image based on the comparison with the predetermined standard image.

Another embodiment of the present disclosure is a non-transitory computer-readable medium storing instructions that cause a computer to execute a method for classifying an image. The method may be as described above.

Another embodiment of the present disclosure is a system for training a generative adversarial network. The system may comprise a generative adversarial network processor, comprising a generative network microprocessor which is configured to be trained by a discriminative network microprocessor, and the discriminative network processor.

In some embodiments, the discriminative network processor may comprise a cascaded system for classifying an image. The cascaded system may be as described above.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

Figure 1:
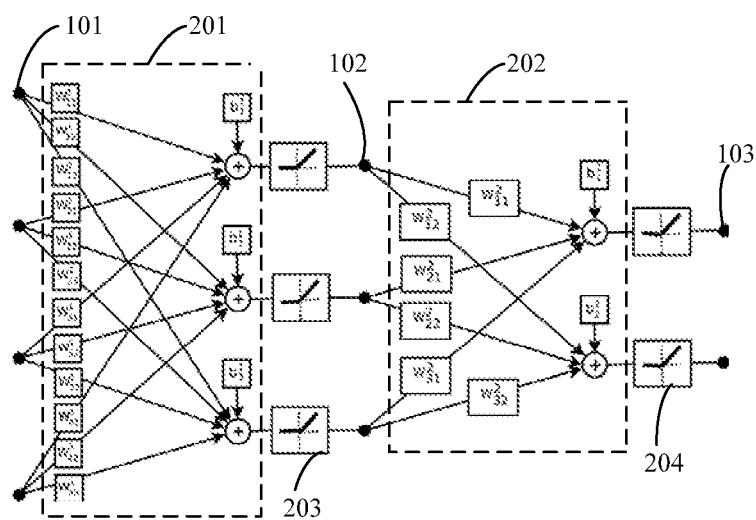
FIG. 1 shows a schematic diagram of a convolutional neural network.

The various features of the drawings are not to scale as the illustrations are for clarity in facilitating one skilled in the art in understanding the invention in conjunction with the detailed description.

DETAILED DESCRIPTION

Next, the embodiments of the present disclosure will be described clearly and concretely in conjunction with the accompanying drawings, which are described briefly above. The subject matter of the present disclosure is described with specificity to meet statutory requirements. However, the description itself is not intended to limit the scope of this disclosure. Rather, the inventors contemplate that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiments for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

Deep learning technology on the basis of an artificial neural network has made great progress in such fields as image processing. Deep learning is a learning method based on characterization of data among machine learning methods. Observed values (such as an image) may be represented in various ways as a vector of intensity values of various pixels, or more abstractly, as a series of edges, an area having a particular shape, et cetera. An advantage of the deep learning technology lies in the solution of different technical problems using an all-purpose structure and a relatively similar system. The benefit of deep learning is to substitute manual acquisition of features with efficient unsupervised or semi-supervised algorithms for feature learning and hierarchical feature extraction.

Images of the natural world may be readily distinguished from images created synthetically by humans or randomly by a computer. Natural images are distinctive at least because they contain particular structure, and are highly non-random. For example, images generated synthetically and randomly by a computer rarely contain a naturalistic scene or object. Image processing systems such as compression algorithms, analogue storage media, and even humans' own visual systems work on real-world images.

A convolutional neural network, or simply convolutional network, is a neural network structure that uses images as input/outputs and replaces scalar weights by filters (that is, convolutions). As an illustrative example, a convolutional network may have a simple structure with three (3) layers. This structure takes in a first number of input images in the input first layer, generates a second number of images at the hidden second layer, and outputs two images at the output layer. At each layer, convolutions followed by biases are added to the images. The result of adding several convolutions and bias then passes through an activation box, which typically corresponds to a rectifying linear unit (ReLU), a sigmoid function, a hyperbolic tangent, and the like. The convolutions and biases are fixed during operation of the network, and are obtained via a training process that involves applying a set of input/output example images and making adjustments to fit some optimization criterion that depends on applications. A typical configuration often involves tens or hundreds of convolutions in each layer. A network with a small number of layers (for example, 3 layers) is considered shallow, whereas a network with more than 5 or 10 layers is normally considered deep.

Convolutional networks are a common deep learning system, and are widely used in image processing technologies, for example, to train image recognition, image classification, and super-resolution image reconstruction.

Conventional technologies for super-resolution image reconstruction reconstruct high-resolution images from their downscaled versions. This often results in the loss of image information, which in turn reduces the realness and perceptual quality of the high-resolution images.

Generative adversarial networks (GANs) are one solution for generating realistic samples of natural images. GANs may be an approach to generative modeling where two models are trained simultaneously or cross-trained.

Learning systems can be configured to adjust parameters based on a specific target, represented by a loss function. In a GAN, the loss function is replaced by another machine learning system that can independently learn a difficult task. A common analogy for GAN is that of a counterfeiter and a police. The generative network can be analogized to the counterfeiter, trying to produce fake currency and use it without detection, whereas the discriminative network can be analogized to the police, trying to detect the fake currency. Competition between the counterfeiter and the police would spur both sides to improve their methods until the counterfeits are indistinguishable from the genuine article.

Both the generative and discriminative networks are trying to optimize a different and opposing objective function, that is, the loss function, in a zero-sum game. Through "cross-training" to maximize the output by the discriminative network, the generative network improves the images it generates, and the discriminative network improves the accuracy in its distinction between the original high-resolution image and the image generated by the generative network. The generative network and the discriminative network compete to generate better images and improve the criteria to evaluate images.

There remains a need to increase the accuracy of the discriminative network in distinguishing between the original high-resolution image and the image generated by the generative network, in order to train the generative network to improve on a particular parameter. For example, there is interest in the task of generating images that are perceived to be real and uncorrupted. This can be applied to problems such as deblurring, denoising, demosaicking, compression removal, contrast enhancement, image super-resolution, et cetera. In such problems, a corrupted image is visually impaired, and a machine learning system may be designed to fix it. However, the target of recovering the original image is often impractical and leads to images that do not look real. GANs are designed to generate "real" images. A typical configuration takes a color output image and uses a machine learning system (e.g. a convolutional network) to output a single number that measures how real is the image. This system can improve perceptual quality, but today, the outputs of the adversarial system remain short of being perceived as natural images by a human viewer.

Super-resolution image reconstruction upscales a base image to generate an image of higher resolution, and more particularly, to generate a super-resolution image that improves the quality of the base image by several factors (for example, 4×). Distortion and perceptual quality are often used to evaluate the effectiveness of the super-resolution image reconstruction. Distortion measures objectively the dissimilarity between the reconstructed image and the base image. Several distortion metrics have been proposed, including mean squared error (MSE), structural similarity index (SSIM), and peak signal to noise ratio (PSNR). On the other hand, perceptual quality focuses more on creating upscaled images that look as real as natural images to human eyes.

A convolutional neural network is often a main component of a deep learning system. FIG. 1 shows a schematic diagram of a convolutional neural network. The convolutional neural network may be configured for image processing, to use images as both input and out, and to replace scalar weights with filters (i.e., convolution).

FIG. 1 shows a convolutional neural network. A convolutional network for image processing is a neural network structure that uses images as input and output, and replaces scalar weights by filters (i.e., convolutions). FIG. 1 shows a convolutional neural network having a simple structure with three (3) layers. In the embodiment illustrated in FIG. 1, the convolutional neural network includes an input layer 101, a hidden layer 102, and an output layer 103. Four (4) images are input into the input layer 101. The hidden layer 102 includes three nodes configured to generate three (3) hidden layer outputs. The output layer 103 includes two nodes configured to generate two (2) outputs.

More particularly, the convolution neural network illustrated in FIG. 1 includes a first convolution layer 201 and a second convolution layer 202. A network with three (3) convolution layers is considered shallow, whereas a network with more than five (5) convolution layers is considered deep. The present disclosure does not limit the number of convolution layers in the convolution neural network, and the number of convolution layers may be determined based on need. A convolution layer includes a plurality of convolution kernels and a plurality of biases. The nodes in each band is assigned a weight $w_{ij}^k$ or a bias $b_i^k$. The weight $w_{ij}^k$ represents the convolution kernel, and the bias $b_i^k$ is the scalar superposed on the output of the convolution layer. In each weight and bias $w_{ij}^k$, $b_i^k$, k represents the input layer 101, and i and j each represents the nodes in the input layer 101 and the hidden layer 102, respectively. The first convolution layer 201 includes the first plurality of convolution kernels ($w_{ij}^1$) and the first plurality of biases ($b_i^1$). The second convolution layer 202 includes the second plurality of convolution kernels ($w_{ij}^2$) and the second plurality of biases ($b_i^2$). Generally, each convolution layer includes from tens to hundreds of convolution kernels.

The result of adding several convolutions and bias then passes through an activation box, which typically corresponds to a rectifying linear unit (ReLU), a sigmoid function, a hyperbolic tangent, and the like. The filters and biases are fixed during the operation of the network, and are obtained in advance through a training process that involves a set of input/output sample images and adjustments to achieve predetermined optimization criteria. The optimization criteria may be application-specific. Typical configurations for a convolution network involve tens or hundreds of filters in each convolution layer.

It is understood that the block diagram of FIG. 1 is not intended to indicate that the convolutional neural network includes only the components shown in FIG. 1. The network according to the present disclosure may include any number of additional layers and/or components known to a person of ordinary skill in the art, but not shown in FIG. 1, depending on the details of the specific implementation.

The convolutional neural network may further include at least one activation layer. The at least one activation layer may be an independent layer in the convolutional neural network, or the active layer may be implemented in the convolution layer. In the embodiment illustrated in FIG. 1, the convolutional neural network includes a first activation layer 203 and a second activation layer 204. The first activation layer 203 is implemented after the first convolution layer 201, and the second activation layer 204 is implemented after the second convolution layer 202. The first and second activation layers 203, 204 are configured to follow an activation function. The activation function is non-linear, and by introducing a non-linear element into the convolutional neural network, the present disclosure makes it possible for the network to be better adapted to solve complex problems. The activation function may be a rectifying linear unit (ReLU) function, a sigmoid function, a hyperbolic tangent (tan h) function, and the like.

The convolutional neural network illustrated in FIG. 1 may be configured for super-resolution reconstruction of an image, which involves using a neural network that has been trained to enhance the resolution of a low-resolution reference image, so as to obtain a higher-resolution image having the target resolution. However, conventional technologies of performing single training on super-resolution reconstruction networks often fail to produce sufficiently realistic images. Generative adversarial networks (GANs) are one solution for generating realistic samples of natural images. A GAN generally includes a generative network that is pitted against a discriminative network. A GAN cross-trains the generative network and the discriminative network, and by pitting the two networks against each other, GANs rely on competition to train the generative network to generate more realistic images and the discriminative network to improve its classifications of fake/real images.

The generative network receives an input of a low-resolution data image, upscales the low-resolution data image, and feeds the upscaled image to the discriminative network. The discriminative network is tasked with classifying whether its input is the output of the generative network (i.e., the "fake" upscaled data image) or the actual image (i.e., the original high-resolution data image). The discriminative network outputs a score between "0" and "1", which measures the probability that its input is the upscaled image and the original image. If the discriminative network outputs a score of "0" or approaching "0", then the discriminative network has determined that the image is the output of the generative network. If the discriminative network outputs a number of "1" or approaching "1", then the discriminative network has determined that the image is the original image. This manner of pitting the generative network against the discriminative network—hence, "adversarial"—utilizes competition between the two networks to drive both networks to improve their methods until the images generated by the generative network are indistinguishable from the originals.

Figure 2:
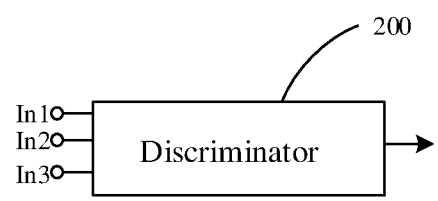
FIGS. 2-3 show block diagrams of a discriminator according to embodiments of the present disclosure.
Figure 3:
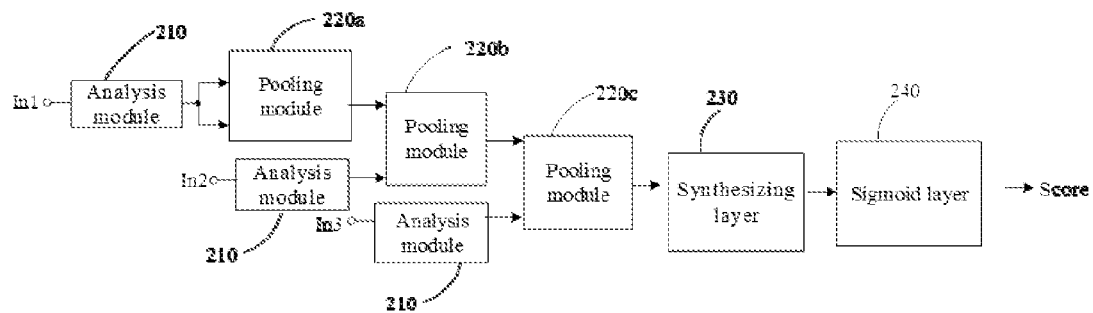

FIGS. 2-3 show block diagrams of a discriminator according to embodiments of the present disclosure.

FIG. 2 shows a discriminator according to an embodiment of the present disclosure. The discriminator is configured to be implemented on the discriminative network of a GAN, and to be adversarially trained with a generative network.

It is understood that the block diagram of FIG. 2 is not intended to indicate that the discriminator includes only the components shown in FIG. 2. The discriminator according to the present disclosure may include any number of additional accessories and/or components known to a person of ordinary skill in the art, but not shown in FIG. 2, depending on the details of the specific implementation.

The generative network may be constructed and configured in any appropriate manner known to a person of ordinary skill in the art, so long as the generative network is capable of upscaling a low-resolution reference image by different upscaling factors to generate a plurality of higher-resolution images having different resolutions. The terms "high resolution" and "higher resolution" mean a resolution that is higher than the resolution of the low-resolution reference image that is input into the generative network. The generative network is configured to upscale the low-resolution reference image by one or more predetermined upscaling factor. As an illustrative, non-limiting example, the resolution of the low-resolution reference image being input into the generative network may be 128*128. The generative network may be configured to perform three (3) upscaling operations on the low-resolution reference image, each upscaling operation upscaling the starting image by a factor of 2, to generate higher-resolution images having the resolutions of 256*256, 512*512, and 1024*1024, respectively.

As shown in FIG. 2, the discriminator 200 may include a plurality of input terminals In1, In2, In3. Each input terminal In1, In2, In3 is configured to acquire an input image from the same set of input images. In some embodiments, the set of input images may include a plurality of high-resolution images generated by the generative network, the plurality of high-resolution images having different resolutions. In other embodiments, the set of input images may include a plurality of preset standard images, each having the same resolution as a corresponding one of the plurality of high-resolution images generated by the generative network. In those embodiments, the discriminator 200 receives the input image directly from the generative network or the source of the preset standard image.

On the other hand, in some embodiments, the input image received by the discriminator 200 is an image generated by preprocessing the output of the generative network and/or the preset standard images. More particularly, the input image may be obtained by extracting feature information from a starting image (an output of the generative network, or a preset standard image), and generating a feature image based on the extracted feature information. The feature image is then normalized to generate a normalized feature image, and the normalized feature image is subject to a series of translational shifts to generate a plurality of shifted images. A plurality of correlation images are generated by determining the correlations between the normalized feature image and the plurality of shifted images. The plurality of correlation images are then transmitted to the discriminator 200 for classification. In these embodiments, the discriminative network is provided with additional information with which to make a classification, for example, by comparing the set of correlations between the output image from the generative network and the shifted images with the set of correlations between a preset standard image and the shifted images. Further, from the Naturalness Image Quality Evaluator (NIQE) no-reference image quality score, it is believed that correlations between the output image (or the original sample image) and the transformed images affect perceptual quality. Classification based on preprocessed correlation images may increase the precision of the classification, improve the accuracy of the classification result, and train the parameters of the generative network toward creating solutions that are highly similar to real images and thus difficult to classify by the discriminative network. This may promote perceptually superior solutions.

The discriminator 200 is configured to select from among the input images received at the input terminals the input image that has the highest resolution, and score the degree of match between the selected input image and a preset standard image having the same resolution.

The discriminator may be a classifier configured to classify an input, by scoring the input image having the highest resolution. The output score represents the probability that the input image is the preset standard image. More particularly, the discriminator is configured to output a score between "0" and "1", which measures the probability that an input image is an image generated by the generative network or a preset standard image. If the discriminator outputs a score of "0" or approaching "0", then the discriminator has determined that the image is the output of the generative network. If the discriminator outputs a number of "1" or approaching "1", then the discriminator has determined that the image is the preset standard image.

A person of ordinary skill in the art would understand that when training a GAN, the discriminative network may be trained to score an input as "real" or "fake" using data having predetermined scores. The "fake" data may be the high-resolution image generated by the generative network, and the "real" data may be a preset standard image. To train the discriminative network, one or more of the discriminative network's parameters is adjusted until the discriminative network outputs a score approaching "1" whenever it receives "real" data, and a score approaching "0" whenever it receives "fake" data. To train the generative network, one or more of the generative network's parameters is adjusted until output of the generative network receives a score as close to "1" as possible from the discriminative network.

As described above, in some embodiments, the set of input images may include a plurality of preset standard images, each having the same resolution as a corresponding one of the plurality of high-resolution images generated by the generative network. The plurality of preset standard images may be obtained by performing a plurality of downsampling operations on a starting image. For example, the generative network may generate a plurality of high-resolution images having the resolutions of 256*256, 512*512, and 1024*1024. An original image of the standard image may have a resolution of 1024*1024, and in that case, the original image may itself be one of the plurality of preset standard images. The original image may then be subject to a plurality of downsampling operations to obtain standard images having the resolutions of 512*512 and 256*256.

In some embodiments, the low-resolution image input into the generative network may be obtained by performing the downsampling operation on the original image. For example, the generative network may be configured to enhance the resolution of a low-resolution image by a factor of 2, 4 and 8. During the training of the GAN, an original image $I_H$ having a resolution of a*a may be downsampled to obtain a low-resolution image $I_L$ having a resolution of 0.125a*0.125a. The low-resolution image $I_L$ may then be input into the generative network. The generative network may then enhance the resolution of the low-resolution image $I_L$ by different factors to obtain higher-resolution images having the resolutions of 0.25a*0.25a, 0.5a*0.5a. In some embodiments, the original image $I_H$ having a resolution of a*a may be downsampled by different factors to obtain a plurality of present standard references having different resolutions (for example, 0.25a*0.25a, 0.5a*0.5a). The original image itself may be one of the plurality of preset standard references.

In the training of the GAN described above, both the generative and discriminative networks are trying to optimize a different and opposing objective function, that is, the loss function, in a zero-sum game. Through "cross-training" to maximize the output by the discriminative network, the generative network improves the images it generates, and the discriminative network improves the accuracy in its distinction between the original high-resolution image and the image generated by the generative network. The generative network and the discriminative network compete to generate better images and improve the criteria to evaluate images.

In conventional GAN technologies, when the discriminative network is classifying the output from the generative network, the discriminative network considers only the output that has undergone a resolution enhancement by a predetermined factor, and scores based on the degree of match between that output and the corresponding preset standard image. For example, if the generative network is configured to enhance the resolution of an image by 8×, then the discriminative network considers only the image that has been enhanced 8×. In contrast, the present disclosure considers not only the image that has been enhanced 8×, but also images that have been enhanced 2×, 4×, and so on. In other words, during training on a neural network system according to the present disclosure, if dissimilarity exists between any image output by the generative network and the corresponding preset standard image having the same resolution, the discriminative network will output a lower score. This encourages the generative network to not only improve the degree of match between the 8×-enhanced image and the corresponding preset standard image, but also the degree of match between the 4×-enhanced image, 2×-enhanced image, and so forth, and their corresponding preset standard images. This drives the generative network to improve its method until the images it generates are indistinguishable from the "real" images.

FIG. 3 shows a discriminator according to an embodiment of the present disclosure. It is understood that the block diagram of FIG. 3 is not intended to indicate that the discriminator includes only the components shown in FIG. 3. The discriminator according to the present disclosure may include any number of additional accessories and/or components known to a person of ordinary skill in the art, but not shown in FIG. 3, depending on the details of the specific implementation.

As shown in FIG. 3, the discriminator 200 may be a cascaded system. The cascaded system includes a plurality of cascade layers, each of which comprises an analysis module 210, a pooling module 220a, 220b, 220c, a synthesis layer 230, and an activation layer 240.

Each of the plurality of analysis modules 210 is coupled to a corresponding one of the plurality of input terminals In1, In2, In3. The analysis modules 210 are configured to receive, through the input terminals In1, In2, In3, the plurality of input images, to extract one or more feature from each of the plurality of input images, and to generate a plurality of features images corresponding to the plurality of input images based on the extracted one or more feature.

Each of the plurality of feature images is a multi-channel image that represents the different dimensions of the corresponding input image. Each of the plurality of feature images has a larger number of color channels than the corresponding input image. For example, the input image may be grayscale or have 3 channels, and the corresponding feature image may have 64 color channels, 128 color channels, or some other arbitrary number of color channels. Each of the plurality of feature images is generated with the same resolution as the corresponding input image.

The first input image input through the first input terminal In1 has a first input resolution $R_{1,\ input}$. The second input image input through the second input terminal In2 has a second input resolution $R_{2,\ input}$. The third input image input through the third input terminal In3 has a third input resolution $R_{3,\ input}$. The first, second, and third input resolutions satisfy the relationship: $R_{1,\ input} > R_{2,\ input} > R_{3,\ input}$. In some embodiments, the first, second, and third input resolutions satisfy the relationship: $R_{1,\ input} = 2R_{2,\ input}$, and $R_{2,\ input} = 2R_{3,\ input}$.

Figure 4:
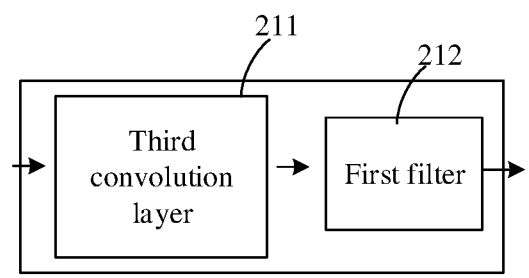
FIG. 4 shows a block diagram of an analysis module according to an embodiment of the present disclosure.

FIG. 4 shows a block diagram of an analysis module according to an embodiment of the present disclosure. It is understood that the block diagram of FIG. 4 is not intended to indicate that the analysis module includes only the components shown in FIG. 4. The analysis module according to the present disclosure may include any number of additional accessories and/or components known to a person of ordinary skill in the art, but not shown in FIG. 4, depending on the details of the specific implementation.

The analysis module 210 may include at least one third convolution layer 211 and a first filter 212. The third convolution layer 211 is configured to perform convolution on an input image to obtain an image having a target number of color channels. The image generated by the third convolution layer 211 is the intermediate feature image of the input image. The third convolution layer 211 may be constructed and configured in any appropriate manner known to a person of ordinary skill in the art, so long as the third convolution layer 211 is capable of performing convolution on an image.

The first filter 212 is configured to apply a filter to the intermediate feature image to obtain the feature image of the input image. The feature image has the same number of color channels as the intermediate feature image. The first filter 212 is configured to transform an image (for example, by extracting feature(s)). The construction and configuration of the first filter 212 are not particularly limited. The first filter 212 may be configured in any appropriate manner known to a person of ordinary skill in the art, including, but not limited to, as a convolutional neural network (CNN), a residual network (ResNet), a densely connected convolutional network (DenseNet), a convolutional neural network with alternately updated clique (CliqueNet), a filter bank, and the like.

Each of the plurality of analysis modules 210 is coupled to one of the plurality of pooling modules 220a, 220b, 220c. The plurality of pooling modules 220a, 220b, 220c are connected in cascade. The present disclosure does not particularly limit the number of cascade layers, and therefore, does not particularly limit the number of pooling modules that may be connected in cascade. A network may be configured to contain any appropriate number of pooling modules and cascade layers known to a person of ordinary skill in the art, for example, depending on the specific implementation or application. The pooling modules 220a, 220b, 220c are configured to receive a plurality of input images, generate a composite image by concatenating the plurality of input images, and perform downsampling on the composite image to generate a downsampled composite image. The downsampled composite image is a multi-channel image. More particularly, the plurality of input images includes the feature image received from the corresponding analysis module 210, and a reference image having the same resolution as the feature image. As shown in FIG. 3, in the first layer of the cascade, the feature image from the analysis module 210 doubles as the reference image for the corresponding pooling module 220a, 220b, 220c. In the subsequent layers of the cascade, the reference image is the downsampled composite image generated by the pooling module 220a, 220b, 220c in the preceding layer of the cascade.

The resolution of the composite image is the same as the resolution of the feature image generated by the corresponding analysis module 210. The number of color channels in the composite image is the sum of the number of color channels in the feature image generated by the analysis module 210 and the number of color channels in the reference image. The number of color channels in the downsampled composite image is the same as the number of color channels in the feature image generated by the analysis module 210. With the exception of the last layer of the cascade, the downsampled composite image generated by each pooling module 220a, 220b, 220c has the same resolution as the feature image generated by an analysis module 210 and received by the pooling module 220a, 220b, 220c in a subsequent layer of the cascade. In the last layer of the cascade, the downsampled composite image generated by the pooling module 220a, 220b, 220c has the same resolution as the low-resolution image input into the generative network. The present disclosure thus makes it possible to ensure that feature image and reference image received by each pooling module 220a, 220b, 220c has the same resolution.

Continuing with the example described above, if the generative network enhances the resolution of the low-resolution image by 2×, then each pooling module 220 will perform a 2× downsampling operation. When the composite image has a resolution of Y*Y, the downsampled composite image will have a resolution of 0.5Y*0.5Y.

Figure 5:
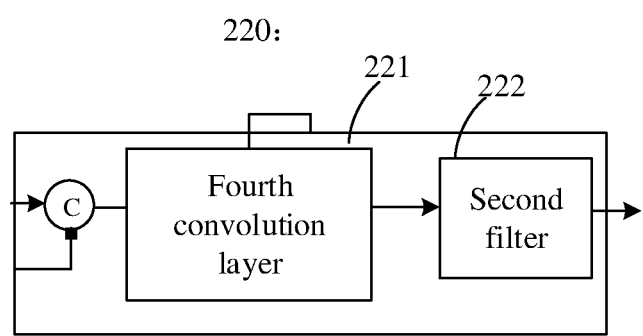
FIG. 5 shows a block diagram of a pooling module according to an embodiment of the present disclosure.

FIG. 5 shows a block diagram of a pooling module according to an embodiment of the present disclosure. It is understood that the block diagram of FIG. 5 is not intended to indicate that the pooling module includes only the components shown in FIG. 5. The pooling module according to the present disclosure may include any number of additional accessories and/or components known to a person of ordinary skill in the art, but not shown in FIG. 5, depending on the details of the specific implementation.

The pooling module 220a, 220b, 220c may include a connector C, at least one fourth convolution layer 221, and a second filter 222.

The connector C is configured to concatenate the feature image generated by the analysis module 210 and the reference image having the same resolution as the feature image, in order to generate a composite image. Concatenation involves superposing the feature image and the reference image. The number of channels in the composite image will be the sum of the number of channels in the feature image and the number of channels in the reference image.

The fourth convolution layer 221 is configured to perform a downsampling operation on the composite image to obtain an intermediate downsampled feature image, which has a lower resolution than the composite image but has the same number of color channels as the composite image. In other words, the fourth convolution layer 221 may be a downsampling layer. The fourth convolution layer 221 may be constructed and configured in any appropriate manner known to a person of ordinary skill in the art, so long as the fourth convolution layer 221 is capable of performing a downsampling operation.

The second filter 222 is configured to apply a filter to the intermediate downsampled feature image to obtain the downsampled feature image. The downsampled feature image has the same number of color channels as the intermediate downsampled feature image.

The fourth convolution layer 221 may include a reverse MuxOut layer, a strided convolution layer, a maxpool layer, or a standard per channel downsampler (for example, a bicubic interpolation layer).

The construction and configuration of the second filter 222 are not particularly limited. The second filter 222 may be configured in any appropriate manner known to a person of ordinary skill in the art, including, but not limited to, as a convolutional neural network (CNN), a residual network (ResNet), a densely connected convolutional network (DenseNet), a convolutional neural network with alternately updated clique (CliqueNet), a filter bank, and the like.

The first output image generated by the pooling module 220a has a first output resolution $R_{1,\ output}$. The second out image generated by the pooling module 220b has a second output resolution $R_{2,\ output}$. The third out image generated by the pooling module 220c has a third output resolution $R_{3,\ output}$. The first, second, and third output resolutions satisfy the relationship: $R_{1,\ output} > R_{2,\ output} > R_{3,\ output}$. In some embodiments, the first, second, and third output resolutions satisfy the relationship: $R_{1,\ output} = \frac{1}{2} R_{1,\ input}$, $R_{2,\ output} = \frac{1}{2} R_{2,\ input}$, and $R_{3,\ output} = \frac{1}{2} R_{3,\ input}$.

The synthesis layer 230 is configured to receive the downsampled composite image from the pooling module 220 in the last layer of the cascaded system (pooling module 220c in the embodiment illustrated in FIG. 3). The synthesis layer 230 is configured to generate a training image based on the downsampled composite image from the last layer of the cascade of pooling modules 220. The number of color channels in the training image is less than the number of color channels in the downsampled composite image. The training image may be a single-channel grayscale image, or a three-channel colored image.

The activation layer 240 is configured to classify the received downsampled composite image generated by the synthesis layer 230, by generating a score that represents a degree of match between the received image and a preset standard image having the same resolution as the received image. The score has a value between "0" and "1". If the score is "0" or approaches "0", then the input image is determined to be the output of the generative network. If the score is "1" or approaches "1", then the image is determined to be the preset standard image. In some embodiments, the activation layer 240 may include a hyperbolic tangent layer and a sigmoid layer. The hyperbolic tangent layer is configured to apply a hyperbolic tangent (tan h) function to generate a score between "−1" and "1", and the sigmoid layer is configured to convert the score into a value between "0" and "1". In some embodiments, the activation layer 240 is the sigmoid layer configured to apply a sigmoid function to directly generate a score between "0" and "1".

Figure 6:
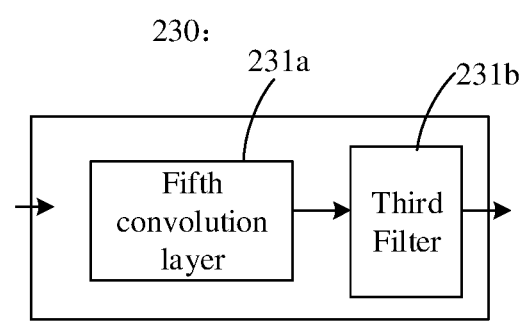
FIG. 6 shows a block diagram of a synthesis module according to an embodiment of the present disclosure.

FIG. 6 shows a block diagram of a synthesis layer according to an embodiment of the present disclosure. It is understood that the block diagram of FIG. 6 is not intended to indicate that the synthesis layer includes only the components shown in FIG. 6. The synthesis layer according to the present disclosure may include any number of additional accessories and/or components known to a person of ordinary skill in the art, but not shown in FIG. 6, depending on the details of the specific implementation.

As shown in FIG. 6, the synthesis layer may include a third filter 231a and at least one fifth convolution layer 231b. The third filter 231a is configured to apply filter to the downsampled composite image from the last layer of the cascade of pooling modules 220a, 220b, 220c (pooling module 220c in the embodiment illustrated in FIG. 3), and to obtain an intermediate training image having the same number of channels as the downsampled composite image. The third filter 231a may be configured in any appropriate manner known to a person of ordinary skill in the art, including, but not limited to, as a convolutional neural network (CNN), a residual network (ResNet), a densely connected convolutional network (DenseNet), a convolutional neural network with alternately updated clique (CliqueNet), a filter bank, and the like.

The fifth convolution layer 231a is configured to perform convolution on the intermediate training image to obtain the training image. The fifth convolution layer 231a may be constructed and configured in any appropriate manner known to a person of ordinary skill in the art, so long as the fifth convolution layer 231a is capable of performing convolution on an image. The training image is then fed to the activation layer 240, where the training image is classified against a preset standard image having the same resolution as the training image.

The activation layer 240 is configured to receive and classify the training image to generate a score that represents a degree of match between the training image and a preset standard image having the same resolution as the training image. It is understood that during image processing, the images are represented as an image array. The classification by the activation layer 240 may therefore involve evaluating the degree of match between the pixel values in the training image and the pixel values in the corresponding preset standard image. More particularly, the training image may be processed using an appropriate function such as the sigmoid function to evaluate the degree of match.

The apparatuses, systems, processes, functionalities, and techniques described in the present disclosure may be implemented on one or more computer systems and/or computing devices that may implement the various techniques described herein. The computing device may be in the form on a general-purpose computer, a microprocessor, in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

For example, an exemplary computing device may include a processing system, at least one computer-readable media, and at least one I/O interface, which are communicatively coupled to one another. The computing device may further include a system bus or other data and command transfer system that couples the various components to one another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system is configured to perform one or more operations using hardware, and may therefore include hardware elements that may be configured as processors, functional blocks, and the like. This may include implementation in hardware as an application specific integrated circuit or other logic device formed using one or more semiconductors. Hardware elements are not limited by the materials from which they are formed or the processing mechanisms employed therein. Processors may contain semiconductor and/or transistors (for example, electronic integrated circuits).

Computer programs (also known as programs, applications, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

I/O interfaces may be any device that allows a user to enter commands and information to the computing device, and also allow information to be presented to the user and/or other components or devices. Examples include, but are not limited to, a display device (e.g., a CRT (cathode ray tube) or LCD (liquid crystal display) monitor) for displaying information to the user, a keyboard and a pointing device (e.g., a mouse or a trackball) by which the user can provide input to the computer. Other kinds of accessories and/or devices can be used to provide for interaction with a user as well, including, for example, feedback provided to the user can be any form of sensory feedback (e.g., visual feedback, auditory feedback, or tactile feedback). Input from the user can be received in any form, including acoustic, speech, or tactile input.

The apparatuses, systems, processes, functionalities, and techniques described in the present disclosure can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the apparatuses, systems, processes, functionalities, and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 7:
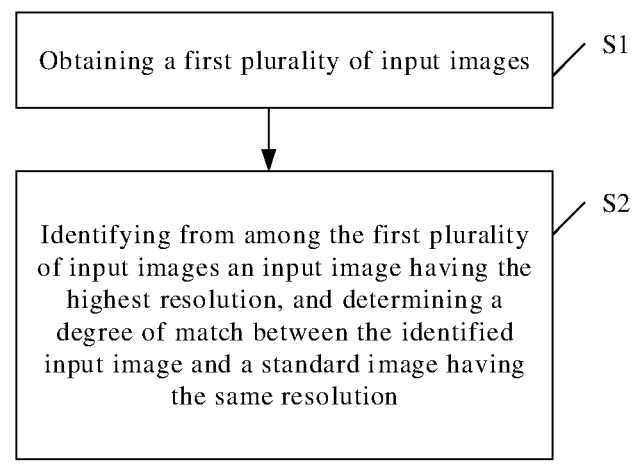
FIGS. 7 and 8 show flow charts of a method for image classification according to embodiments of the present disclosure.

FIG. 7 shows a flow chart of a method for image classification according to an embodiment of the present disclosure. The method for image classification according to the present disclosure may be applied to training a GAN. The method for image classification may be implemented on a discriminator as described above.

The GAN comprises a generative network that is configured to enhance a plurality of input images by a plurality of factors to obtain a plurality of higher-resolution images, and that is configured to be trained by a discriminative network. The construction and configurations of the generative network may be as described above. The GAN also comprises a discriminative network coupled to the generative network. The construction and configurations of the discriminative network may be as described above.

As shown in FIG. 7, the method for image classification includes:

Step S1: A first plurality of input images are obtained. The first plurality of input images includes the plurality of higher-resolution images generated by the generative network, or a plurality of preset standard images having the same resolutions as the plurality of higher-resolution images generated by the generative network.

Step S2: The input image having the highest resolution is identified from among the first plurality of input images. The input image having the highest resolution is then compared to the preset standard image having the same resolution as the input image, and a degree of match between the images is determined.

Figure 8:
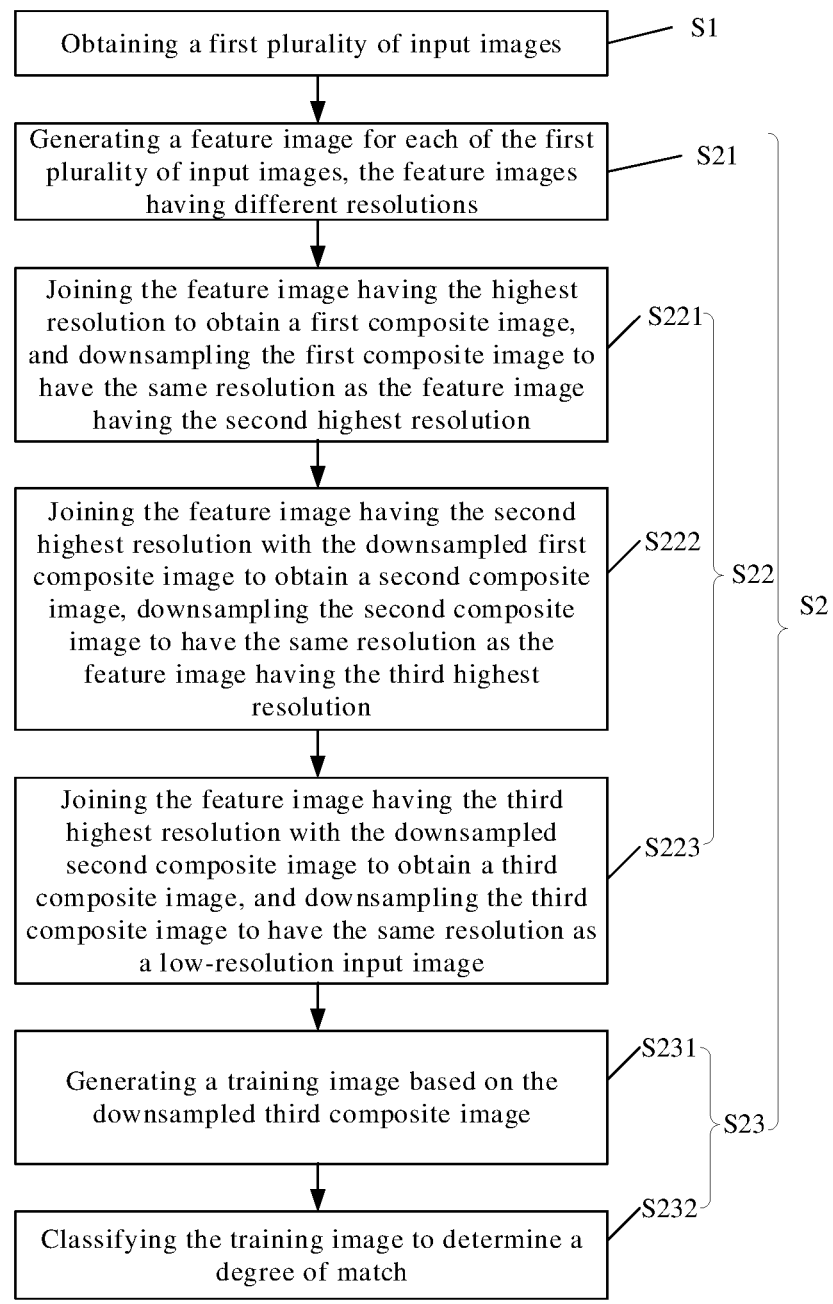

FIG. 8 shows a flow chart of a method for image classification according to an embodiment of the present disclosure.

The method for image classification includes steps S1 and S2 described above. Step S2 may further include the following steps:

Step S21: A feature image is generated for each of the first plurality of input images. As an illustrative, non-limiting example, assume that the first plurality of input images includes three (3) input images. The three features images corresponding to the three input images may be ranked according to their resolutions as R1, R2, and R3, with R1 having the highest resolution and R3 having the lowest resolution.

Step S21 may be performed by the analysis module 210 described above. The analysis module 210 may include a third convolution layer 211 and a first filter 212. The third convolution layer 211 is configured to perform convolution on an input image to generate an intermediate feature image. The first filter 212 is configured to apply a filter to the intermediate feature image to obtain the feature image of the corresponding input image. The feature image has the same number of channels as the intermediate feature image.

Step S22: A plurality of downsampling operations are performed. A downsampling operation is performed on each feature image. A downsampling operation includes: concatenating the feature image (for example, generated by the analysis module 210) and a reference having the same resolution as the feature image to obtain a composite image; and downsampling the composite image to obtain a downsampled feature image. The downsampled feature image is a multi-channel image, and has the same number of channels as the feature image.

The reference image in the first downsampling operation is the feature image corresponding to the downsampling operation. After the first downsampling operation, the reference image is the downsampled feature image generated by the preceding downsampling operation.

The downsampling operations may be performed by the pooling module 220a, 220b, 220c descried above. The pooling module 220a, 220b, 220c may include a connector C, a fourth convolution layer 221, and a second filter 222. The connector C is configured to join the feature image and the reference image having the same resolution as the feature image, in order to generate a composite image. The fourth convolution layer 221 is configured to perform a downsampling operation on the composite image to obtain an intermediate downsampled feature image, which has a lower resolution than the composite image but has the same number of channels as the composite image. The second filter 222 is configured to apply a filter to the intermediate downsampled feature image to obtain the downsampled feature image. The downsampled feature image has the same number of channels as the intermediate downsampled feature image.

Continuing with the illustrative, non-limiting example above, where the plurality of feature images are R1, R2, and R3, with R1 having the highest resolution and R3 having the lowest resolution, the step S22 may further include the following steps:

Step S221: The feature image R1 is joined to the feature image R1 to obtain the first composite image. The first composite image is downsampled to obtain the downsampled feature image R11, which has the same resolution as the feature image R2.

Step S222: The feature image R2 and the downsampled feature image R11 are joined to obtain the second composite image. The second composite image is downsampled to obtain the downsampled feature image R12, which has the same resolution as the feature image R3.

Step S223: The feature image R3 and the downsampled feature image R12 are joined to obtain the third composite image. The third composite image is downsampled to obtain the downsampled feature image R13, which has the same resolution as the low-resolution image being input into the generative network.

Step S23: The degree of match between the downsampled feature image obtained in the last downsampling operation (R13 in the above example) and a preset standard image is determined. More particularly, step S23 may include the following steps:

Step S231: A training image is generated based on the downsampled composite image obtained in the last downsampling operation. The number of channels in the training image is less than the number of channels in the downsampled composite image. The training image may be a single-channel grayscale image, or a three-channel colored image.

Step S232: The training image is classified to generate a score that represents a degree of match between the training image and a preset standard image having the same resolution as the training image.

The present disclosure also provides a computer-readable medium that stores the instructions for performing the method for image processing and image classification as described above.

The term "computer-readable medium" may refer to any computer program product, apparatus and/or device (e.g., magnetic discs, optical disks, memory, Programmable Logic Devices (PLDs) used to provide machine instructions and/or data to a programmable processor, including a machine readable medium that receives machine instructions as a machine-readable signal. The term "machine-readable signal" refers to any signal used to provide machine instructions and/or data to a programmable processor. The computer-readable medium according to the present disclosure includes, but is not limited to, random access memory (RAM), a read-only memory (ROM), a non-volatile random access memory (NVRAM), a programmable read-only memory (PROM), erasable programmable read-only memory (EPROM), electrically erasable PROM (EEPROM), flash memory, magnetic or optical data storage, registers, disk or tape, such as compact disk (CD) or DVD (digital versatile disc) optical storage media and other non-transitory media.

In conventional GAN technologies, when the discriminative network is classifying the output from the generative network, the discriminative network considers only the output that has undergone a resolution enhancement by a predetermined factor (for example, the output having the highest resolution), and scores based on the degree of match between that output and the corresponding preset standard image. In contrast, the present disclosure considers not only the image having the highest resolution, but also images that have a range of resolutions. In other words, during training on a neural network system according to the present disclosure, if dissimilarity exists between any image output by the generative network and the corresponding preset standard image having the same resolution, the discriminative network will output a lower score. This encourages the generative network to not only improve the degree of match between the highest-resolution image and the corresponding preset standard image, but also the degree of match between the lower-resolution images, and so forth, and their corresponding preset standard images. This drives the generative network to improve its method until the images it generates are indistinguishable from the "real" images.

Various techniques are described in the present disclosure in the general context of software, hardware elements, or program modules. Generally, such modules include routines, programs, objects, elements, components, data structures, and so forth, which perform particular tasks or implement particular abstract data types. The terms "module", "functionality", "component" as used herein generally represent software, firmware, hardware, or a combination thereof. The features of the techniques described in the present disclosure are platform-independent, meaning that the techniques may be implemented on a variety of computing platforms having a variety of processors.

References in the present disclosure made to the term "some embodiment," "some embodiments," and "exemplary embodiments," "example," and "specific example," or "some examples" and the like are intended to refer that specific features and structures, materials or characteristics described in connection with the embodiment or example that are included in at least some embodiments or example of the present disclosure. The schematic expression of the terms does not necessarily refer to the same embodiment or example. Moreover, the specific features, structures, materials or characteristics described may be included in any suitable manner in any one or more embodiments or examples. In addition, for a person of ordinary skill in the art, the disclosure relates to the scope of the present disclosure, and the technical scheme is not limited to the specific combination of the technical features, and also should cover other technical schemes which are formed by combining the technical features or the equivalent features of the technical features without departing from the inventive concept. What is more, the terms "first" and "second" are for illustration purposes only and are not to be construed as indicating or implying relative importance or implied reference to the quantity of indicated technical features. Thus, features defined by the terms "first" and "second" may explicitly or implicitly include one or more of the features. In the description of the present disclosure, the meaning of "plural" is two or more unless otherwise specifically and specifically defined.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. A cascaded system for classifying an image, comprising:
    a first cascade layer comprising a first analysis module coupled to a first input terminal, and a first pooling module coupled to the first analysis module,
    a second cascade layer comprising a second analysis module coupled to a second input terminal, and a second pooling module coupled to the first pooling module and the second analysis module,
    a synthesis layer coupled to the second pooling module, and
    an activation layer coupled to the synthesis layer,
    wherein the first cascade layer is configured to receive a first input image having a first input resolution $R_{1,\ input}$ via the first analysis module and generate a first output image via the first pooling module based on the first input image,
    wherein the second cascade layer is configured to receive a second input image having a second input resolution $R_{2,\ input}$ via the second analysis module and the first output image from the first cascade layer, and generate a second output image via the second pooling module,
    wherein the synthesis layer is configured to generate a training image based on the second output image,
    wherein the activation layer is configured to apply an activation function to the training image, and classify the training image based on the comparison with a predetermined standard image,
    wherein the first input resolution and the second input resolution have the following relationship: $R_{1,\ input} > R_{2,\ input}$, and
    wherein each of the first output image and the second output image has a lower resolution than the corresponding first input image and second input image, respectively;
    wherein the first pooling module is configured to concatenate a first feature image generated by the first analysis module with itself to generate a first composite image, and downsample the first composite image to generate a first downsampled composite image,
    wherein the second pooling module is configured to concatenate the second input image with the first output image to generate a second composite image, and downsample the second composite image to generate a second downsampled composite image, and
    wherein the first downsampled composite and the second downsampled composite image are the first, and second output images, respectively.

2. The cascaded system according to claim 1, wherein $R_{1,\ input} = R_{2,\ input}$,
    wherein the first output image has a first output resolution $R_{1,\ output}$, and the second output image has a second output resolution $R_{2,\ output}$, and
    wherein $R_{1,\ output} = \frac{1}{2} R_{1,\ input}$, and $R_{2,\ output} = \frac{1}{2} R_{2,\ input}$.

3. The cascaded system according to claim 1, wherein each of the first analysis module and the second analysis module is configured to generate a feature image of a corresponding input image.

4. The cascaded system according to claim 3, wherein the feature image has a larger number of color channels than the corresponding input image.

5. The cascaded system according to claim 3, wherein each of the first analysis module and the second analysis module comprises a first convolution layer configured to perform a convolution on the corresponding input image to generate an intermediate feature image, and a first filter configured to apply a first filter to the intermediate feature image to generate the feature image.

6. The cascaded system according to claim 1, wherein each of the first, and second downsampled composite images has the same number of color channels as the corresponding feature image.

7. The cascaded system according to claim 1, wherein each of the first, and second pooling modules comprises a connector configured to perform the concatenating, a second convolution layer configured to downsample a corresponding composite image to generate an intermediate downsampled composite image, and a second filter configured to apply a second filter to the intermediate downsampled composite image to generate the downsampled composite image.

8. The cascaded system according to claim 1, wherein the training image has a smaller number of color channels than the second output image.

9. The cascaded system according to claim 1, wherein the synthesis module comprises a third filter configured to apply a third filter to the third output image to generate an intermediate training image, and a fourth convolution layer configured to perform a convolution on the intermediate training image to generate the training image.

10. The cascaded system according to claim 1, wherein the activation layer comprises a sigmoid layer.

11. A system for training a generative adversarial network, comprising:
    a generative adversarial network processor, comprising a generative network microprocessor which is configured to be trained by a discriminative network microprocessor, and the discriminative network processor,
    wherein the discriminative network processor comprises the cascaded system according to claim 1.

12. A method for classifying an image, the method comprising:
    identifying from a plurality of input images a first input image having a highest resolution,
    performing at least one downsampling operation on the first input image on a cascaded convolutional neural network, and
    classifying an output image generated by performing the at least one downsampling operations, based on a comparison with a predetermined standard image;
    wherein the performing of the at least one downsampling operations comprises:
    extracting one or more feature from the first input image to generate a first feature image of the first input image,
    concatenating the first feature image with itself to generate a first composite image,
    downsampling the first composite image to generate a first output image,
    extracting one or more feature from a second input image from among the plurality of input images to generate a second feature image,
    concatenating the second feature image with the first output image to generate a second composite image, and downsampling the second composite image to generate a second output image.

13. The method according to claim 12, wherein the first output image has a lower resolution than the first input image, and the same resolution as the second input image.

14. The method according to claim 12,
wherein the first input image has a first input resolution $R_{1,\,input}$, and the second input image has a second input resolution $R_{2,\,input}$, and
wherein $R_{1,\,input} = 2R_{2,\,input}$.

15. The method according to claim 14,
wherein the first output image has a first output resolution, and the second output image has a second output resolution, and
wherein $R_{1,\,output} = \tfrac{1}{2} R_{1,\,input}$, and $R_{2,\,output} = \tfrac{1}{2} R_{2,\,input}$.

16. The method according to claim 12, wherein the steps of extracting, concatenating, and downsampling are repeated for each of the plurality of input images in sequence, and each subsequent one of the plurality of input images has a lower resolution than a previous one of the plurality of input images.

17. The method according to claim 12, wherein the classifying of the output image comprises:
generating a training image based on the output image, and
classifying the training image based on the comparison with the predetermined standard image.

18. A non-transitory computer-readable medium storing instructions that cause a computer to execute the method according to claim 12.

* * * * *